United States Patent Office 3,078,763
Patented Feb. 26, 1963

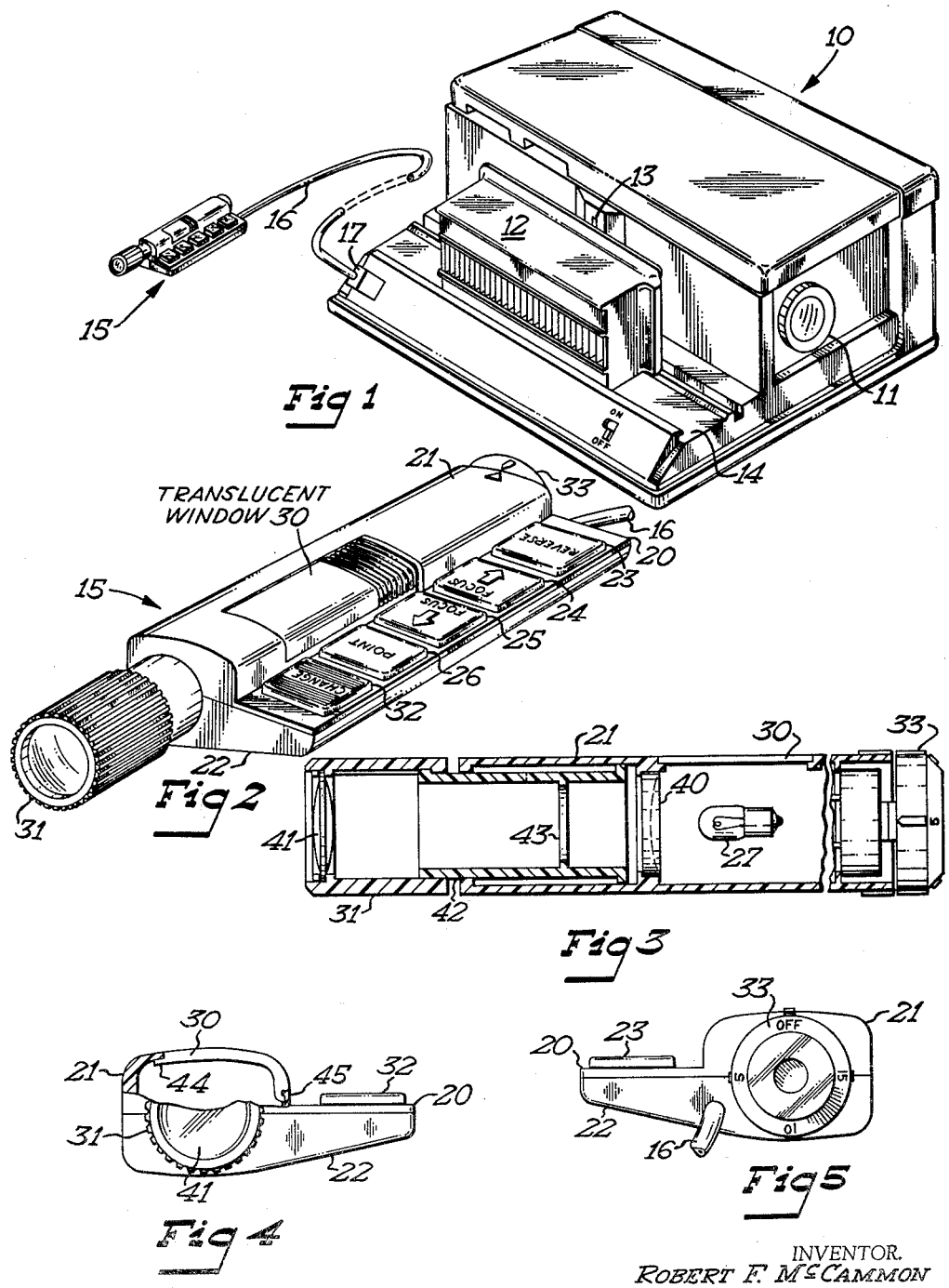

3,078,763
REMOTE CONTROL UNIT FOR A PHOTO-
GRAPHIC PROJECTOR
Robert F. McCammon, Denver, Colo., assignor to Minneapolis-Honeywell Regulator Company, Minneapolis, Minn., a corporation of Delaware
Filed June 23, 1961, Ser. No. 119,183
4 Claims. (Cl. 88—28)

The present invention is concerned with a remote control unit for a photographic projector and particularly with a unit of this general type incorporating a unique construction providing keyboard type switch means and a pointer-viewing light arrangement, incorporated into a single unitary housing adapted to be hand held by the operator of the projector.

A photographic slide projector can be characterized as a projector in which a transparency is illuminated by a light source and, by means of an objective lens, is focused on a screen or the like such that the scene present on the transparency is displayed for viewing. Automatic projectors of this type utilize slide storage trays holding a plurality of slides which can be shown in sequence, either at the option of the operator or in a timed sequence where each slide is displayed for a given interval of time, usually for a number of seconds. In order to improve the ease of operation of such a projector, it is desirable that the projector be controlled from a remote position such that the operator of the projector may also enjoy the slides being displayed on the screen. Furthermore, the operator of the projector many times desires to point out items of interest in the scenes being displayed, particularly in the case where a commentary accompanies the presentation of a group of slides. Such a commentary may be read by the operator of the projector at the remote position. Furthermore, it is sometimes desirable, particularly upon the initial loading of a slide tray to provide means to edit the slides, that is to view the slides in a preliminary nature to determine the content of the slide before the slide is placed in the tray and displayed upon the screen.

The apparatus of my invention provides a unique construction whereby a single unitary housing incorporates a flat keyboard portion incorporating a number of switch means which can be individually actuated to control the slide projector. Furthermore, my unitary housing includes a tubular portion housing a light bulb controlled by one of the switch means. This light bulb is thus selectively energized by the operator of the projector. One end of the tubular housing includes a movable lens member which is movable to focus a pointer at the screen such that the remote control unit can be hand held and moved by the operator of the projector to point out the various items of interest within the scene being displayed. The tubular portion of the housing also includes a removable translucent window which is located directly above the bulb and thus also gathers light from the bulb. This translucent window, thus illuminated by the bulb, is utilized to provide reading light or slide editing light as necessary and as determined by the operator of the projector. Thus, my unique construction provides means whereby a single bulb at the remote control unit provides both a pointer light and a reading or editing light. Furthermore, the other end of the tubular portion of the housing includes an automatic sequence control to thus provide timing operation of the automatic projector being controlled.

The unique construction of my remote control unit is such that the remote control unit can either be hand held or placed with the flat portion of the housing placed on a table or the like. Thus, the keyboard portion of the housing is conveniently available for remote control of the projector.

My invention will be apparent to those skilled in the art upon reference to the following specification, claims, and drawings of which:

FIGURE 1 is a perspective view of an automatic photographic projector showing the remote control unit of the present invention connected thereto by means of a multi-conductor electrical cord, FIGURE 2 is a perspective view of the remote control unit of FIGURE 1, shown to a larger scale, FIGURE 3 is a section view of the remote control unit, showing the optical alignment of the movable pointer lens, the bulb, and the translucent window, FIGURE 4 is a partial section view showing the manner in which the translucent window is constructed so as to be removable to facilitate bulb replacement, and FIGURE 5 is an end view, showing the automatic sequence control for providing timed operation of the automatic projector.

Referring specifically to FIGURE 1, reference numeral 10 designates generally an automatic slide projector having a housing including means defining an optical axis in alignment with a movable objective lens 11. As mentioned, this type of a projector is effective to cause slides to be moved from a slide tray 12 through a slide receiving window 13 to the projection compartment of the projector wherein the slides are displayed on a screen or the like. The slide tray 12 is constructed and arranged to hold a plurality of individual slides and the slide tray moves along the slide tray platform 14 of the projector in a step-like movement as these slides are displayed. The control of projector 10 is achieved by means of a unique remote control unit of my invention, this unit being designated generally by means of reference numeral 15. The remote control unit is connected by means of a long multi-conductor cord 16 to a connector outlet 17 at the projector to thus allow the operator of the projector to control the same from a remote position.

Referring now to FIGURE 2, the remote control unit 15 is seen in greater detail. Thus, it can be seen that the housing of the remote control unit, which is formed of an opaque material, is provided with a first flat keyboard portion 20, a second generally tubular portion 21, and a flat bottom portion 22, such that the remote control unit can be placed on a table or the like and the keyboard 20 is readily accessible for easy control by the operator of the projector. The keyboard 20 includes a plurality of raised switch means. Reference numeral 23 designates a switch which controls the direction of movement of the slide tray 12, shown in FIGURE 1. Switches 24 and 25 control the remote focusing of the objective lens 11 of FIGURE 1. Switch 26 is connected to control the energization of a bulb 27 disposed within the tubular portion 21, as shown in FIGURE 3. The bulb 27 is located directly below a translucent window 30 and in alignment with a movable pointer lens member 31.

Reference numeral 32 identifies a change switch which, when momentarily depressed by the operator of the projector, facilitates the changing of a single slide. If it is desired to change the slides in automatic timed sequence, then the automatic sequence control 33 may be set to provide such operation. As seen in FIGURE 2, control 33 is disposed at the opposite end of the tubular portion 21 from the movable lens 31. FIGURE 5 shows control 33 and from this view it can be seen that this control provides timed operation at 5, 10, or 15 second intervals, control 33 being set in the off position as shown in FIGURE 5.

FIGURES 4 and 5 show the general cross section shape of my improved remote control unit wherein the tubular portion 21 and the keyboard portion 20 are joined by the generally flat bottom portion 22. Thus, the remote control unit may be placed on a table or the like and the switch means positioned at the keyboard portion 20 are readily available for easy control by the operator of the projector.

Referring to FIGURE 3, the bulb 27 is shown positioned within its compartment, the socket of the bulb not being shown for purpose of simplicity. The bulb 27 is, however, positioned generally below the translucent window 30 and in alignment with the movable lens 31 such that upon energization of this bulb, under the control of switch 26, light therefrom proceeds both in an upward direction out of the translucent window 30 and in a forward direction through a lens 40 and a further lens 41, this latter lens being movable. The movable portion 31—41 is mounted on a tubular extention 42 of the tubular portion 21, number 42 being slidable within the portion 21 and containing a portion 42 defining a pointer image which is focused on the screen to facilitate pointing to items of interest within the scene being displayed from the slide.

My unique construction not only provides a plurality of remote operations in a single convenient remote control unit, but also is constructed and arranged to facilitate easy replacement of bulb 27. This is achieved by means of translucent window 30 which is removable to provide access to bulb 27. As seen in FIGURE 4, window 30 is provided with an extending lip 44 mating with a portion of the tubular housing 21 and is also provided with a mating latch portion 45 which can be released due to resilience of the translucent window 30 to allow removal of the window and bulb replacement.

Thus, it can be seen that I have provided a remote control unit which not only provides complete remote control of the automatic projector 10, including timed sequence control by means of the automatic sequence control 33, but also provides the use of the remote control unit as a pointer and as a reading light, facilitating reading and editing as desired by the operator of the projector. Modifications of the present invention will be apparent to those skilled in the art and it is therefore intended that the scope of the present invention be limited solely by the scope of the appended claims.

I claim as my invention:

1. A remote control unit for an automatic photographic projector; an opaque housing of a size adapted to be hand held by the operator of the projector, said housing having a generally flat bottom portion, an elongated oval shaped portion, and an elongated shallow keyboard portion, with said oval portion and said keyboard portions forming the top of said housing; a multiconductor electrical cord interconnecting said housing and the projector to be controlled, switch means connected to said cord and disposed within said keyboard portion of said housing and having actuating means extending above said housing to facilitate control of said switch means, a bulb mounted within said oval portion and connected to said cord, a movable pointer lens mounted at the end of said oval portion to thereby gather light from said bulb to facilitate the use of the remote control unit as a pointer, and a translucent window formed in said oval portion to gather light from said bulb to facilitate slide editing and the like by the operator of the projector.

2. The remote control unit for use with an automatic photographic projector; an opaque housing having an elongated tubular portion joined by a shallow elongated keyboard portion and a flat bottom portion, said tubular portion and keyboard portion defining the top of the housing, the housing being adapted to be hand held by the operator of the projector; a multiconductor electrical cord interconnecting said housing and the projector to be controlled from a remote position, a plurality of individual switch buttons extending above said keyboard portion and operatively communicating with a plurality of switch means disposed within said housing, said switch means being inter-connected with said electrical cord to facilitate remote control of the projector, a bulb electrically connected to one of said switch means to be selectively energized thereby, means mounting said bulb within said tubular portion of said housing, a tubular extension formed at one end of said tubular portion, a movable pointer lens mounted on said tubular extension to gather light from said bulb to facilitate the focusing of a pointer on the screen or the like with which the projector is used, and a removable translucent window formed in said tubular portion directly above said bulb to also gather light from said bulb to facilitate slide editing and the like by the operator of the projector, said window being removable to facilitate easy replacement of said bulb.

3. A remote control unit for use with an automatic photographic projector; an opaque housing having an elongated tubular portion joined by a flat elongated keyboard portion and a flat bottom portion, said tubular portion and keyboard portion defining the top of said housing; a multiconductor electrical cord inter-connecting said housing and the projector to be controlled from a remote position, a plurality of switch buttons extending above said keyboard portion and operatively communicating with a plurality of switch means disposed within said housing to facilitate control of the projector, a bulb electrically connected to one of said switch means and mounted within said tubular portion, a pointer lens disposed at one end of said tubular portion to gather light from said bulb, a timer sequence control disposed at the other end of said tubular portion to facilitate timed control of the projector, and a removable translucent window formed in said tubular portion to also gather light from said bulb, said window being removable to facilitate replacement of said bulb.

4. A remote control unit for an automatic photographic projector; an opaque housing of a size adapted to be hand held by the operator of the projector, said housing having a generally flat bottom portion, an elongated oval shaped portion, and an elongated keyboard portion; a multiconductor electrical cord interconnecting said housing and the projector to be controlled, switch means connected to said cord and disposed within said keyboard portion of said housing and having actuating means extending above said housing to facilitate control of said switch means, a bulb mounted within said oval portion and connected to said cord, a movable pointer lens mounted at the end of said oval portion to thereby gather light from said bulb to facilitate the use of the remote control unit as a pointer, and a translucent window formed in said oval portion to gather light from said bulb to facilitate slide editing and the like by the operator of the projector.

References Cited in the file of this patent

UNITED STATES PATENTS

| | | |
|---|---|---|
| 1,360,575 | Pinto | Nov. 30, 1920 |
| 3,023,669 | Hall | Mar. 6, 1962 |